Patented Apr. 27, 1954

2,676,887

UNITED STATES PATENT OFFICE 2,676,887

PHOTOCHEMICAL PROCESS AND PRODUCT

Lyman Chalkley, Prince Georges County, Md.

No Drawing. Application November 3, 1950,
Serial No. 194,017

6 Claims. (Cl. 95—7)

This invention relates to a photochemical process and product, and more particularly to the photoactivation of the cyanides of the aminotriphenylmethane dyes.

The cyanides of aminotriphenylmethane dyes are colorless or light colored solids which show no pronounced change on exposure to light. An object of the present invention is to provide a process for activating these substances so that they become sensitive to ultraviolet and respond to irradiation by the development of a pronounced color. The photoactivated cyanides are useful for actinometry of the ultraviolet, for measuring the output of germicidal and erythemal lamps, for measuring the erythemal strength and dosage of sunlight, and for photography by short wave ultraviolet. They are also useful to receive the tracing in recording instruments. Other uses and advantages will become apparent from the following disclosure. The activated dye cyanides are most useful for recording ultraviolet energy of wave length shorter than 3250 A. u.

The cyanides of aminotriphenylmethane dyes are para substituted triphenylacetonitriles. Examples of aminotriphenylmethane dyes are: malachite green, brilliant green, pararosaniline, rosaniline, crystal violet. The corresponding dye cyanides are, respectively: 4,4'-bis-dimethylamino - triphenylacetonitrile, 4,4' - bis-diethylamino - triphenylacetonitrile, 4,4',4''-triaminotriphenylacetonitrile, 4,4',4'' - triamino-3-methyl-triphenlyacetonitrile (one form), 4,4',4''-trisdimethylamino - triphenylacetonitrile. These aminotriphenylacetonitriles are not necessarily prepared from the corresponding dyes, but in order to avoid confusion with other nitriles to be mentioned in this specification they will be referred to as dye cyanides.

The phenomenon of photoactivation with which the invention deals may be illustrated by the following example: If a thin layer of finely powdered crystal violet cyanide is exposed to the sun for a few minutes it shows no change. If, however, 5 parts by weight of this powder are intimately mixed with 1 part by weight of phenylacetonitrile and a thin layer of the powdered mixture exposed to sunlight for a few minutes the powder takes on an intense violet color. The dye cyanide has become activated to light by admixture with phenylacetonitrile. If more of the phenylacetonitrile is added the powder becomes damp, and, with increasing quantities, tacky, pasty and finally a complete solution in the phenylacetonitrile; but the mixture retains its photosensitivity through all these forms, and, in fact, into a highly diluted solution.

Phenylacetonitrile is a liquid at room temperatures, which makes for easy intimate mixing with the dye cyanide. However, it is not essential for activation that the activator be a liquid at room temperature. Thus, if the dye cyanide is intimately ground at room temperature with solid succinonitrile a strongly photosensitive product is obtained.

Photoactivation of the aminotriphenylmethane dye cyanides depends upon the chemical nature of the activator. I have found the following chemicals to be effective activators:

1. *Nitriles in which the cyano group is attached to a carbon atom that also carries a hydrogen atom*, such as, acetonitrile, n-valeronitrile, n-capronitrile, lauronitrile, stearonitrile, glyconitrile, beta-hydroxypropionitrile, succinonitrile, phenylacetonitrile, gamma-phenoxybutyronitrile.

2. *Phosphoric acid esters*, such as triethyl phosphate, tri-n-butyl phosphate, tri-o-cresyl phosphate, tri-m-cresyl phosphate.

3. *Aromatic amines containing a hydrogen atom on the nitrogen atom.* Their formula is $HNR^1R^2$, where $R^1$ is an aromatic nucleus and $R^2$ is hydrogen or an aromatic or aliphatic radical. Examples are aniline, monomethylaniline, o-chloronaniline, diphenylamine, o-anisidine, m-anisidine, m-toluidine.

4. *Aromatic carbinols*, such as phenylmethyl carbinol, phenyl-iso-propyl carbinol, benzyl alcohol, beta-phenylethyl alcohol, gamma-phenylpropyl alcohol.

5. *Polyoxy compounds containing at least one ether group in their molecules.* These have as a minimum the grouping $R^1—O—R^2—O—R^3$, where $R^1$ and $R^2$ are organic radicals, and $R^3$ is hydrogen or an organic radical. The compound may contain many more than two oxygen atoms. Examples are, veratrole, resorcinol dimethyl ether, ethyleneglycol diethyl ether, diethyleneglycol diethyl ether, tetraethyleneglycol dimethyl ether, ethyleneglycol mono-(p.-tert. butylphenyl) ether, ethyleneglycol mono-(p-tert. amylphenyl) ether, ethyleneglycol mono-(di-tert. amylphenyl) ether, triethyleneglycol di-2-ethylbutyrate, triethyleneglycol di - 2 - ethylhexoate, polyethyleneglycol of average molecular weight 200, polyethyleneglycol of average molecular weight 300, polyethyleneglycol of average molecular weight 400, polyethyleneglycol of average molecular weight 1500, polyethyleneglycol of average molecular weight 4000.

Each of the chemicals specifically mentioned as an example in the above list has been found by trial with aminotriphenylmethane dye cyanides to be an effective photoactivator, and none has failed to activate any aminotriphenylmethane dye cyanide with which it was tried.

The activation of the cyanides of the triphenylmethane dyes is effected by intimate admixture of the cyanide and the activator. Simple mechanical mixture is effective if sufficiently complete. Another means of mixture is to evaporate a volatile solvent from a solution containing both cyanide and activator. Or the dye cyanide and activator may be mutually precipitated from solution by addition of a solvent in which they are both insoluble.

Additional examples, showing the preparation of photoactivated dye cyanides in useful forms, are given below. These preparations should, of course, be carried out in absence of ultraviolet radiation.

EXAMPLE 1

One-half gram of crystal violet cyanide is mixed with 100 ml. of a 10% solution of approximately half acetylated polyvinyl alcohol (a trade designation for such a material is Elvanol 20–105) in 57% (by weight) of isopropyl alcohol, and the cyanide ground into the liquid in a mortar or mill. The mixture is poured onto a level glass plate and allowed to dry. After thorough drying the film is soaked for 10 minutes at room temperature in aniline, and any adhering aniline wiped or blotted off. The film is rendered strongly photosensitive by the aniline it absorbs, and on irradiation with ultraviolet develops an intense violet color.

The polyvinyl alcohol film retains aniline well, and out of circulating air will remain photosensitive for some time. In freely circulating air the aniline slowly evaporates, and when it is gone the film is "fixed" and no longer develops a strong color on exposure to ultraviolet. Thus evaporation of the aniline can be used to fix the image formed by exposure to ultraviolet. However, if fixing of the image is important and a long shelf life is not necessary, the film is better sensitized by soaking in acetonitrile for ten minutes at room temperature shortly before exposure. After exposure the acetonitrile can be evaporated to leave an image that is fixed.

In this preparation the polyvinyl alcohol provides a supporting film, while the activator is aniline or acetonitrile.

EXAMPLE 2

A polyvinyl alcohol film containing crystal violet cyanide is prepared as in Example No. 1 and activated by soaking in beta phenylethyl alcohol for ten minutes. A film sensitized in this way has a more pleasant odor than one sensitized with aniline, and does not develop on storage the yellow tinge which will sometimes form in aniline activated films on prolonged contact with air. However, it is possible to obtain somewhat deeper colors with the aniline activated film.

EXAMPLE 3

A polyvinyl alcohol film containing crystal violet cyanide is prepared as in Example 1 and brushed with tetra-ethyleneglycol dimethyl ether. After ten minutes any excess liquid is wiped off. The film sensitized in this way becomes violet on exposure to ultraviolet. The tetraethyleneglycol dimethyl ether is odorless, but its high water solubility may be a drawback for some applications.

EXAMPLE 4

A water leaf paper is wetted with a solution of 0.2 gram of malachite green cyanide, 1.0 gram octadecane nitrile, 5.0 grams tri-o-cresyl phosphate in toluene to a total volume of 40 ml., and hung up and dried in circulating air. The dry paper develops an intense green color on exposure to ultraviolet. In this preparation both the octadecane nitrile and the tri-o-cresyl phosphate are activators. Their use together has the added advantage that the octadecane nitrile thickens the tri-o-cresyl phosphate and forms a gel with it.

EXAMPLE 5

Filter paper is wetted by dipping into the following solution:

0.1 gram para-rosaniline cyanide dissolved in a mixture of 10 ml. of toluene and 10 ml. of acetonitrile.
1.0 gram of polymethylmethacrylate (prepared without added peroxide) dissolved in 10 ml. of warm toluene.
5.8 grams of tri-o-cresyl phosphate, commercial grade without free phosphoric acid.
Toluene to a total volume of 80 ml.

The wet paper is hung in a ventilated space for a few hours to air dry; and, after drying, is stored in closed jars or tin cans. On irradiation by ultraviolet this paper develops a strong red color.

In this example the acetonitrile is used as a solvent rather than as an activator and is removed by evaporation during the preparation. The polymethylmethacrylate is a thickening agent, and the tri-o-cresyl phosphate is the activator.

EXAMPLE 6

Paper is prepared as in Example 5 except that the tri-o-cresyl phosphate is replaced by an equal weight of pure tri-m-cresyl phosphate, which is free of uncombined phosphoric acid and acid esters. The tri-m-cresyl phosphate is more expensive but less toxic than the tri-o-cresyl phosphate.

EXAMPLE 7

One part by weight of malachite green cyanide is dissolved in 200 parts by weight of tributyl phosphate by warming to 50° C. The resulting clear colorless solution is strongly phototropic, becoming green under ultraviolet irradiation and fading to colorless again in the dark. Without the addition of added cyanide or alkali this preparation fades very rapidly in the dark at room temperature. It is a superior material for use in phototropic actinometry. It is little volatile, virtually odorless, the coloring and fading reactions are very fast so that equilibrium is reached quickly, and the fading reaction is so vigorous that the preparation lends itself readily to the estimation of the erythemal component of strong light sources, such as sunlight.

EXAMPLE 8

Forty grams of polyethyleneglycol having an average molecular weight of 4000 (a suitable commercial product is Carbowax 4000) is mixed with 20 ml. of a toluene solution of malachite green cyanide, having a concentration of 2 grams per 100 ml. The mixture is heated to a temperature at which the polyethyleneglycol melts, and filter paper is then impregnated by dipping into the warm liquid. The paper is hung up and dried in a dry atmosphere. The rather stiff, translucent, dry paper is best stored in well closed jars or vials to protect it from moisture in the atmosphere, which tends to make the paper limp and tacky. The dried paper develops an intense green color on exposure to ultraviolet.

EXAMPLE 9

A molten mixture of polyethyleneglycol having an average molecular weight of 4000, malachite green cyanide and toluene is prepared as in Example 8 and brushed onto double weight photographic paper stock, and the coated paper thoroughly dried. The resulting product differs from that of Example 8 in having an opaque paper base. The paper of Example 8 is more useful in photometric measurements where readings are to be made by transmitted light, while the paper of Example 9 is more suitable where the image is to be examined by reflected light.

EXAMPLE 10

A solution of 1.0 gram of malachite green cyanide,, 43.5 grams of ethylenglycol mono-(p-tert. butylphenyl) ether, 58 g. polymethylmethacrylate (made without added peroxide) in toluene to a total volume of 70 ml. is poured onto level glass plates and the toluene allowed to evaporate. The resulting clear, transparent, colorless film becomes bright green on irradiation by ultraviolet. The film is phototropic and if kept in the dark after exposure much of the color fades within 24 hours, to return again if reexposed to ultraviolet. The film may also be detached from the supporting glass plate and has enough strength to be transferred to other supports or used by itself. The same coating preparation may be used on a paper support. In such use a good photographic paper base should be employed.

EXAMPLE 11

Filter paper is impregnated by dipping into a solution of 0.1 gram para-rosaniline cyanide, 1.0 gram polymethylmethacrylate (prepared without added peroxide), 5.8 grams of ethyleneglycol mono-(p-tert. butylphenyl) ether and 10 ml. of acetonitrile, in toluene to a total volume of 80 ml., and the volatile solvents evaporated at room temperature from the paper.

EXAMPLE 12

Paper is prepared as in Example 11 except that the ethyleneglycol mono-(p-tert. butylphenyl) ether is replaced by an equal amount of ethyleneglycol mono-(p-tert. amylphenyl) ether. The amyl compound is more readily available commercially than the butyl, but the commercial amyl product may contain impurities which reduce somewhat the sensitivity of the paper to ultraviolet radiation.

EXAMPLE 13

Filter paper is impregnated by dipping in the following solution:

0.075 gram para-rosaniline cyanide.
6.5 grams ethyleneglycol mono-p-tert. butylphenyl) ether.
1.15 grams polymethylmethacrylate.
0.3 gram anhydrous picric acid, or 0.333 gram 90% picric acid.
0.375 gram triethylamine.
30. ml. acetonitrile.
Toluene to a total volume of 120 ml.

The wet paper is exposed at room temperature to a current of free air for an hour and then for 24 hours to an atmosphere having a high relative humidity—80% is satisfactory. In the moist atmosphere the paper undergoes a ripening process in which the triethylammonium picrate distributes itself between the paper fibers and the added organic materials. The ripened paper may be stored in closed containers as it is, or may be further dried briefly in an atmosphere of 50% relative humidity before storage. The paper, which is initially yellow, is very much slower than that of Example 5, and colors at such a rate that it can be used in integrating sunburn or erythemal dosage meters.

In this preparation the ethyleneglycol mono-(p-tert. butyphenyl) ether is the activator. The polymethyl methacrylate is a thickening agent. The picric acid is a light absorbing agent to reduce the speed with which the paper reacts to light. The triethylamine accelerates the ripening process. The acetonitrile and toluene are used only as solvents and eliminated in the course of the preparation.

In the above examples, the paper used as a support for activated dye cyanide materials should be free from drying oils and resins. The paper stock used for photographic developing out paper is satisfactory, as are the water leaf papers, such as filter papers. Sized papers which are free of rosin, drying oils and other auto-oxidizing substances are also satisfactory.

The proportions of the dye cyanide and activator are not critical and can be varied over a wide range, as described earlier in this specification. Except where otherwise indicated the preparations of the examples are carried out at room temperature.

It will be seen from these examples that the dye cyanide and activator may be combined with materials to thicken the mixture, or to give a supporting film. They may be supported directly on paper or on glass or other surfaces. Also the photoactivated dye cyanides may be combined with other materials to modify the action of ultraviolet radiation. Many other applications of the invention will occur to those skilled in the art.

I claim:

1. A process for forming a colored substance from a colorless one comprising the steps of photoactivating an aminotriphenylmethane dye cyanide by forming an intimate macroscopically homogeneous mixture of said cyanide with an activator selected from the group consisting of veratrole, resorcinol dimethyl ether, ethylene glycol ethers, phosphoric acid ester of a monohydroxy compound, aromatic carbinol, aromatic amine containing a hydrogen atom on the nitrogen atom, nitrile in which the cyano group is attached to a carbon atom which also holds a hydrogen atom; and irradiating said photoactivated dye cyanide with ultraviolet energy of wave length shorter than 3250 A. u.

2. A photosensitive composition comprising an intimate macroscopically homogeneous mixture of an aminotriphenylmethane dye cyanide with an activator selected from the group consisting of veratrole, resorcinol dimethyl ether, ethylene glycol ethers, phosphoric acid ester of a monohydroxy compound, aromatic carbinol, aromatic amine containing a hydrogen atom on the nitrogen atom, nitrile in which the cyano group is attached to a carbon atom which also holds a hydrogen atom.

3. A photosensitive product comprising a supporting base carrying a photosensitive composition consisting of an intimate macroscopically homogeneous mixture of an aminotriphenylmethane dye cyanide with an activator selected from the group consisting of veratrole, resorcinol dimethyl ether, ethylene glycol ethers, phosphoric acid ester of a monohydroxy compound, aromatic carbinol, aromatic amine containing a hydrogen atom on the nitrogen atom, nitrile in which the cyano group is attached to a carbon atom which also holds a hydrogen atom.

4. A photosensitive product comprising a supporting base bearing a film which contains a photosensitive composition consisting of an intimate macroscopically homogeneous mixture of an aminotriphenylmethane dye cyanide with an activator selected from the group consisting of veratrole, resorcinol dimethyl ether, ethylene glycol ethers, phosphoric acid ester of a monohydroxy compound, aromatic carbinol, aromatic amine containing a hydrogen atom on the nitrogen atom, nitrile in which the cyano group is attached to a carbon atom which also holds a hydrogen atom.

5. A photosensitive product comprising filter paper impregnated with an intimate macroscopically homogeneous mixture of pararosaniline cyanide, polymethylmethacrylate, and tri-m-cresyl phosphate.

6. A photosensitive product comprising a layer of pure paper carrying an agent which absorbs ultraviolet, and a photosensitive composition consisting of an intimate macroscopically homogeneous mixture of an aminotriphenylmethane dye cyanide with an activator selected from the group consisting of veratrole, resorcinol dimethyl ether, ethylene glycol ethers, phosphoric acid ester of a monohydroxy compound, aromatic carbinol, aromatic amine containing a hydrogen atom on the nitrogen atom, nitrile in which the cyano group is attached to a carbon atom which also holds a hydrogen atom.

References Cited in the file of this patent

UNITED STATES PATENTS

| Number | Name | Date |
|---|---|---|
| 1,845,835 | Frankenburger et al. | Feb. 16, 1932 |
| 2,366,179 | Chalkley | Jan. 2, 1945 |
| 2,441,561 | Chalkley | May 18, 1948 |

FOREIGN PATENTS

| Number | Country | Date |
|---|---|---|
| 4,994 | Great Britain | Dec. 31, 1904 |

OTHER REFERENCES

Harris et al., Journal of American Chemical Soc., vol. 57 (1935), pages 1151–1159.

Karrer, Organic Chemistry (1946), pages 336 and 337, Second English ed., Elsevier Pub. Co., N. Y.